Jan. 10, 1950     E. F. DICKIESON, JR     2,494,117
REFRIGERATING MEANS, INCLUDING A PLURALITY OF FANS
AND ADJUSTABLE MEANS FOR DRIVING THE SAME
Filed July 10, 1947
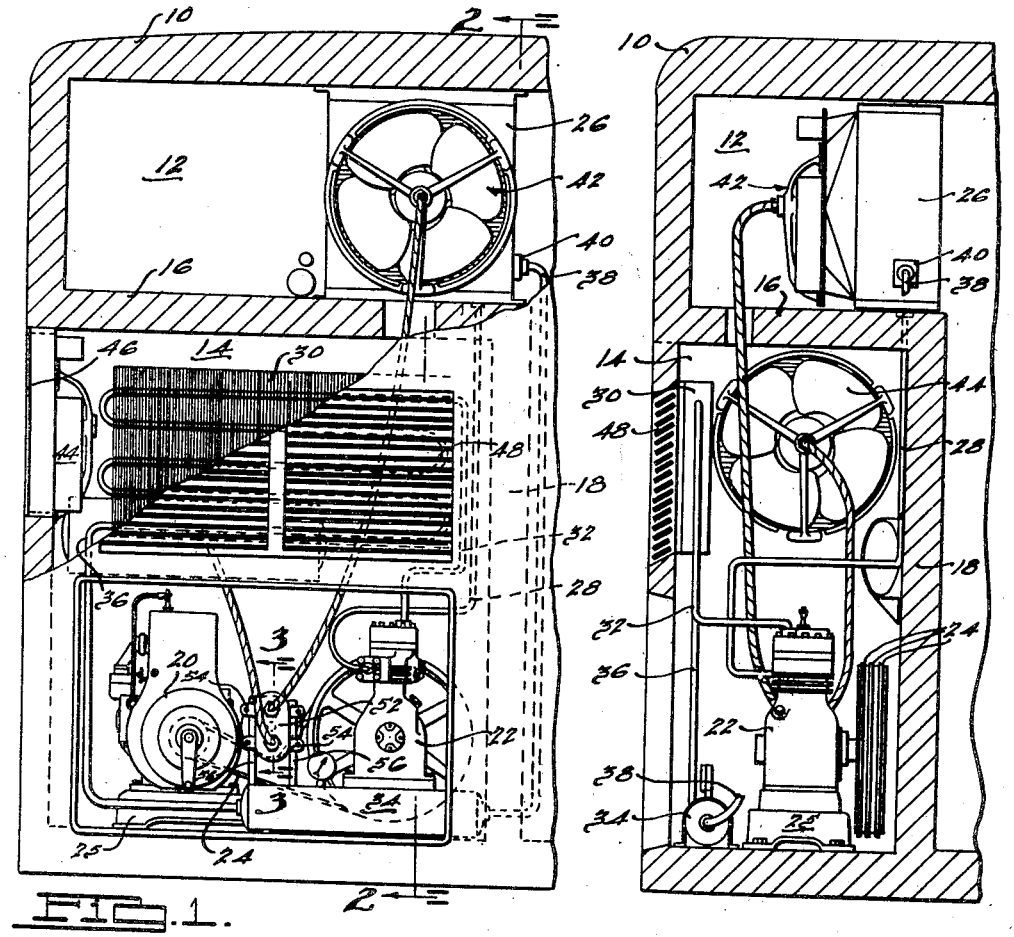
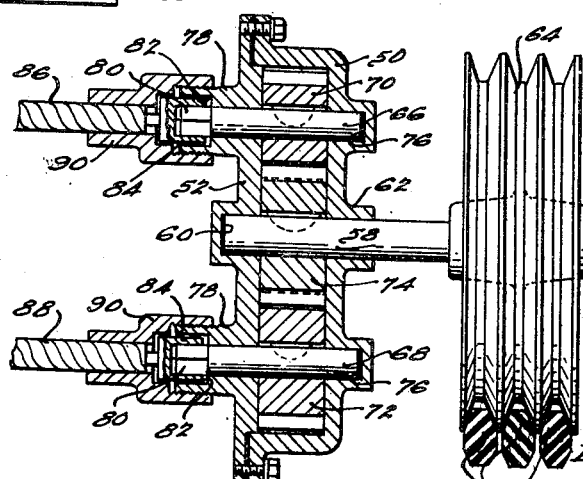
INVENTOR.
Edward F. Dickieson, Jr.
BY
ATTORNEYS.

Patented Jan. 10, 1950

2,494,117

UNITED STATES PATENT OFFICE 2,494,117

REFRIGERATING MEANS, INCLUDING A PLURALITY OF FANS AND ADJUSTABLE MEANS FOR DRIVING THE SAME

Edward F. Dickieson, Jr., Detroit, Mich.; Nathalie L. Dickieson executrix of said Edward F. Dickieson, Jr., deceased Application July 10, 1947, Serial No. 759,991

7 Claims. (Cl. 62—115)

This invention relates broadly to new and useful improvements in refrigeration apparatus of the type having evaporator and condenser units and a compressor for circulating refrigerant liquid therethrough; more particularly, the invention relates to a novel unit of refrigeration apparatus which performs a double function in the combination of tightening the endless belt which drives the compressor and of driving the fans associated with the evaporator and condenser units.

An important object of the present invention is to provide a novel refrigeration apparatus which is adapted primarily for refrigerating vehicle bodies of the truck or trailer type.

Another object of the invention is to provide a refrigeration apparatus of the above-mentioned character wherein the various units comprising the apparatus are compactly arranged for mounting in a vehicle body.

Still another object of the invention is to provide a refrigeration apparatus of the above-mentioned character which includes a novel combination belt tightener and fan drive.

Yet another object of the invention is to provide a combination belt tightener and fan drive which is pre-eminently suited for use with refrigeration apparatus of the above-mentioned character and which can be readily adapted to drive the fans at different predetermined suitable speeds.

Other objects and advantages of the invention will be apparent during the course of the following description.

In the drawing forming a part of this specification and wherein like numerals are employed to designate like parts throughout the same:

Fig. 1 is a vertical, transverse sectional view through a trailer vehicle having a refrigeration apparatus embodying the present invention associated therewith;

Fig. 2 is a vertical, longitudinal sectional view taken on the line 2—2 of Fig. 1; and Fig. 3 is an enlarged, vertical sectional view taken on the line 3—3 of Fig. 1.

In the drawing, wherein for the purpose of illustration is shown a preferred embodiment of the invention, the numeral 10 designates a vehicle body of the truck or trailer type. Only the front portion of the vehicle body is shown in the drawing, and the body here shown is of insulated construction to render it suitable for refrigeration purposes. Upper and lower chambers 12 and 14 are provided in the front portion of the vehicle body 10 for reception of refrigeration apparatus. The two chambers 12 and 14 are separated by a horizontal, insulated wall 16, and the lower chamber 14 is separated from the storage compartment of the vehicle by a vertical, insulated wall 18.

The refrigeration apparatus here shown comprises an internal combustion engine 20 which drives a compressor 22 through endless belts 24. Both the engine 20 and the compressor 22 are mounted on the usual base 25. Vaporous refrigerant under low pressure is drawn by the compressor 22 from an evaporator 26 through pipe 28 and discharged under high pressure to a condenser 30 through pipe 32. In the condenser 30 the refrigerant is converted to a liquid and thence flows to a receiver tank 34 through a pipe 36. From the receiver tank 34 the refrigerant liquid is returned to the evaporator 26 through pipe 38 and expansion valve 40. The evaporator 26 is provided with a fan 42 which circulates air within the vehicle body 10 through the evaporator to cool the same. Also, a fan 44 is mounted in an inlet opening 46 provided in a side wall of the body 10 adjacent to the condenser 30, which fan 44 draws atmospheric air into the chamber 14 and circulates it around the condenser, internal combustion engine 20, and compressor 22 to cool the same before discharging it through an outlet opening 48 in the front wall of chamber 14. The above units are conventional and comprise no part of the present invention except in so far as they are associated with and related to the apparatus embodying this invention.

As suggested, the present invention provides a novel unit which performs a double function in the combination of tightening the endless belts 24 and of simultaneously driving the two fans 42 and 44. More particularly, the unit embodying the present invention comprises a vertically adjustable gear case 50 having a removable cover 52 and laterally extending clamping arms 54. As best shown in Fig. 1, the gear case 50 is located in the lower portion of chamber 14 between the engine 20 and compressor 22 with clamping arms 54 around spaced vertical posts 56 which are fixed to the base 25. A drive shaft 58 is mounted for rotation substantially centrally of the gear case 50, and the shaft 58 extends transversely entirely through the case. One end of shaft 58 is received in a socket journal provided in the cover 52 and the other end thereof extends entirely through the opposite wall of the case 50. The latter end of shaft 58 is supported by a boss 62 formed integrally on the case 50, and the projecting portion of the shaft carries a multigrooved sheave 64 which engages downwardly against the endless belts 24, as clearly shown in Fig. 3.

From the foregoing it will be readily apparent that the gear case 50 is vertically adjustable on the post 56 and that the drive shaft 58 is vertically adjustable with the case to selectively tension the endless belts 24. Thus, the unit functions as a belt tightener and the drive shaft 58 is rotatably driven by the endless belts 24 through the medium of sheave 64.

Also journaled for rotation in the gear case 50 above and below the drive shaft 58 are driven shafts 66 and 68. Gears 70 and 72 keyed on driven shafts 66 and 68 respectively mesh with a gear 74 on the drive shaft 58 to rotate the driven shafts in timed relation to the drive shaft. One terminal portion of each driven shaft 66 and 68 is received in a socket journal 76 provided in the case 50, and the other terminal portions thereof extend through openings in the cover 52. The latter portions of the driven shafts 66 and 68 are supported by bosses 78, and both the shafts and the bosses are formed to provide power take-off connections. In the form of the invention here shown, the power take-off connections comprise squared ends 80 on the driven shafts 66 and 68, which ends project into sockets 82 in the bosses 78 and receive correspondingly shaped couplings 84 on flexible cables 86 and 88. Both cables 86 and 88 are provided with the usual nuts 90 which fasten couplings 84 to bosses 78. The distal end of flexible cable 86 is attached to the rotary fan 42, and the distal end of flexible cable 88 is attached to the rotary fan 44.

Thus the driven shafts 66 and 68 rotatably drive fans 42 and 44 through the medium of flexible cables 86 and 88, and the driven shafts 66 and 68 are rotated at speeds corresponding to the gear ratios between the drive gear 74 and the driven gears 70 and 72. It is contemplated that gears 70, 72, and 74 be removable from their respective shafts so that gears of different size can be employed to vary the gear ratio and thus regulate the rotative speed of fans 42 and 44.

It may thus be seen that the unit embodying the present invention not only maintains the endless belts 24 taut, but it also utilizes power transmitted through the endless belts 24 to drive both of the fans 42 and 44. By mounting the case 50 for vertical adjustment in the manner here shown, the tension of belts 24 can be selectively varied; and by combining and correlating the drive and driven shafts and their respective gears in the manner described, the fans 42 and 44 can be rotatably driven at different predetermined speeds. The entire assembly is simple but inherently strong and rugged in construction and the entire unit is exceedingly compact. Manifestly, in an apparatus of this character, all of these considerations are of the essence.

It is to be understood that the form of the invention herewith shown and described is to be taken as a preferred example of the same and that various changes in the size, shape, and arrangement of parts may be resorted to without departing from the spirit of the invention or the scope of the appended claims.

Having thus described the invention, I claim:

1. In refrigeration apparatus having an evaporator, a fan for circulating air over said evaporator, a condenser, a fan for circulating air over said condenser, a compressor for circulating refrigerant from the condenser to the evaporator, a power source, and endless belt means connecting said power source and said compressor, a fan drive and belt tightener structure comprising an adjustable case, drive and driven shafts carried by said case, gear means connecting said drive and driven shafts, a pulley on said drive shaft peripherally engaging said endless belt means to drive said drive shaft and adjustable with the case to vary the tension of said endless belt means, and flexible cables connecting said drive shafts to respective of said fans.

2. In refrigeration apparatus having a fan, a compressor, a power source, and endless belt means connecting said power source and said compressor, a fan drive and belt tightener structure comprising an adjustable case, drive and driven shafts carried by said case, means connecting said drive and driven shafts for rotation of said driven shaft by said drive shaft, a pulley on said drive shaft peripherally engaging said endless belt means to drive said drive shaft and adjustable with the case to vary the tension of said endless belt means, and means connecting said driven shaft and said fan whereby the latter is rotatably driven by the former.

3. In refrigeration apparatus having an evaporator, a fan for circulating air over said evaporator, a condenser, a fan for circulating air over said condenser, a compressor for circulating refrigerant from the condenser to the evaporator, a power source, and endless belt means connecting said power source and said compressor, a combination fan drive and belt tightener structure comprising an adjustable case, drive and driven shafts carried by said case, gear means connecting said drive and driven shafts, a pulley on said drive shaft peripherally engaged with said endless belt means to drive said drive shaft and adjustable with the case to vary the tension of said endless belt means, and means connecting said driven shafts to respective of said fans.

4. In refrigeration apparatus having an evaporator, a fan for circulating air over said evaporator, a condenser, a fan for circulating air over said condenser, a compressor for circulating refrigerant from the condenser to the evaporator, a power source, and endless belt means connecting said power source and said compressor, a combination fan drive and belt tightener structure comprising an adjustable case, drive and driven shafts carried by said case, gear means connecting said drive and driven shafts, said gear means being detachable from said shafts and removable from the case so that various selected gear ratios may be employed for driving said driven shafts, a pulley on said drive shaft peripherally engaged with said endless belt means to drive said drive shaft and adjustable with said case to vary the tension of said endless belt means, and flexible cables connecting said driven shafts to respective of said fans.

5. In refrigeration apparatus having an evaporator, a fan for circulating air over said evaporator, a condenser, a fan for circulating air over said condenser, a compressor for circulating refrigerant from the condenser to the evaporator, a power source, and endless belt means connecting said power source and said compressor, a combined fan drive and belt tightener structure comprising an adjustable case, a drive shaft carried by said case, two driven shafts in said case, gear means connecting said drive shaft and said driven shafts, a pulley on said drive shaft peripherally engaged with said endless belt means, a flexible cable connecting said evaporator fan to one of said driven shafts, and a second flexible cable connecting said condenser fan to the other of said driven shafts, the parts so constructed and arranged that said pulley establishes a driving connection between said endless belt means and said drive shaft and at the same time is adjustable with the case to vary the tension of said endless belt means whereby said case and its adjuncts serve a double function in the combination of tightening said endless belt means and of driving said evaporator and condenser fans.

6. In refrigeration apparatus having an evaporator, a fan for circulating air over said evaporator, a condenser, a fan for circulating air over said condenser, a compressor for circulating refrigerant from the condenser to the evaporator, a power source, and endles belt means connecting said power source and said compressor, a combined fan drive and belt tightener structure comprising an adjustable case, a drive shaft carried by said case, two driven shafts in said case, gear means connecting said drive shaft and said driven shafts, a pulley on said drive shaft peripherally engaged with said endless belt means, and means connecting said driven shafts to respective of said fans.

7. In refrigeration apparatus having an evaporator, a fan for circulating air over said evaporator, a condenser, a fan for circulating air over said condenser, a compressor for circulating refrigerant from the condenser to the evaporator, a power source, and endless belt means connecting said power source and said compressor, a combined fan drive and belt tightener structure comprising an adjustable case, a drive shaft carried by said case, two driven shafts in said case, means for transmitting motion from said drive shaft to said driven shafts, a pulley on said drive shaft peripherally engaged with said endless belt means, a flexible cable connecting said evaporator fan to one of said driven shafts, and a second flexible cable connecting said condenser fan to the other of said driven shafts, the parts so constructed and arranged that said pulley establishes a driving connection between said endless belt means and said drive shaft and at the same time is adjustable with the case to vary the tension of said endless belt means, whereby said case and its adjuncts serve a double function in the combination of tightening said endless belt means and of driving said evaporator and condenser fans.

EDWARD F. DICKIESON, Jr.

REFERENCES CITED

The following references are of record in the file of this patent:

UNITED STATES PATENTS

| Number | Name | Date |
| --- | --- | --- |
| 2,260,900 | Henney | Dec. 30, 1937 |